Aug. 2, 1955  C. A. MANIER  2,714,715
OIL LEVEL INDICATOR

Filed April 20, 1953  2 Sheets-Sheet 1

Charles A. Manier
INVENTOR.

BY Clarence A. O'Brien
and Harvey B. Jacobson
Attorneys

Aug. 2, 1955   C. A. MANIER   2,714,715
OIL LEVEL INDICATOR
Filed April 20, 1953   2 Sheets-Sheet 2
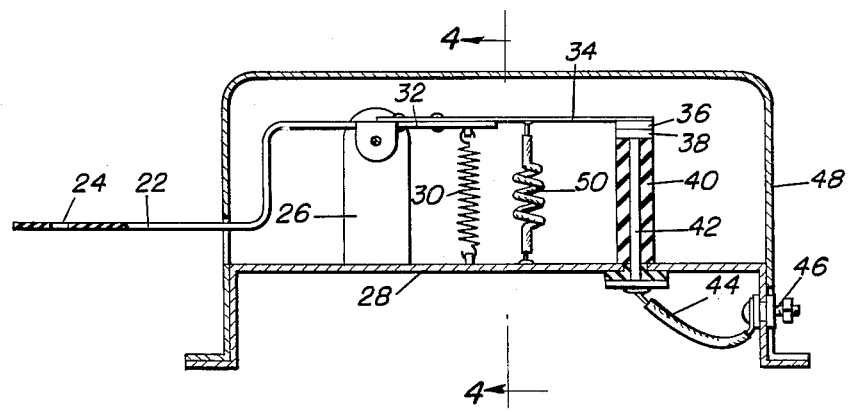
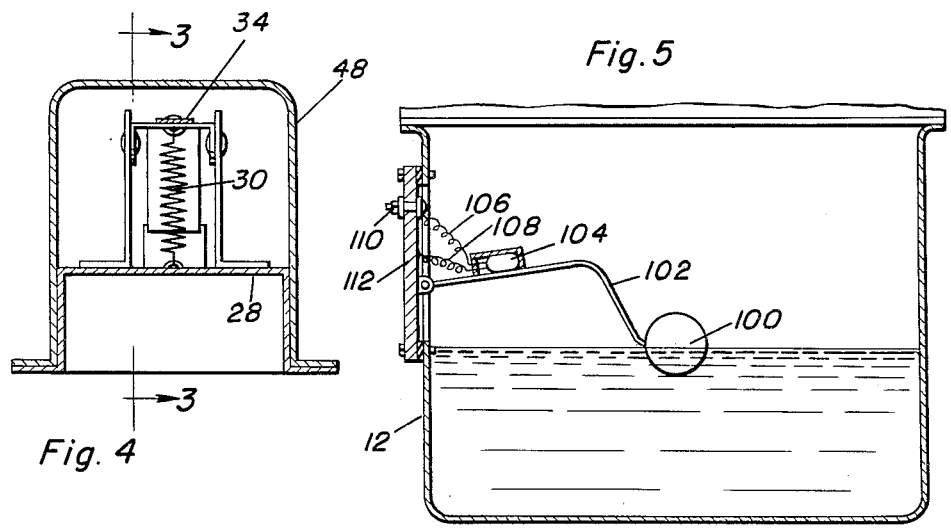
Charles A. Manier
INVENTOR.

United States Patent Office 2,714,715
Patented Aug. 2, 1955

2,714,715

OIL LEVEL INDICATOR

Charles A. Manier, Houston, Mo.

Application April 20, 1953, Serial No. 349,895

1 Claim. (Cl. 340—244)

This invention relates to an attachment for an internal combustion engine and more particular to a device for indicating the level of oil in the crank case thereof.

The primary object of this invention resides in the provision of means for indicating to a motorist whether or not the oil level in the crank case of the motor of the automobile, truck, or other vehicle which he is operating is at a safe level or whether the oil level is low requiring immediate addition of lubricating oil thereto to insure proper lubrication of bearings, pistons, valves, and other moving parts of the motor.

The construction of this invention features the use of a red and a green signal lamp which are adapted to be mounted on the dashboard of the vehicle. These lamps are selectively actuated through a relay by means of a switch connected to a float in the crank case of the vehicle.

Still further objects of the invention reside in the provision of an oil level indicator that is strong and durable, simple in construction and operation, capable of being readily and easily installed on various makes and models of internal combustion engines, and which is relatively inexpensive to produce.

These, together with the various ancillary objects and features of the invention which will become apparent as the following description proceeds, are attained by this oil level indicator, preferred embodiments of which have been illustrated in the accompanying drawings, by way of example only, wherein:

Figure 3 is a sectional detail view as taken along the plane of line 3—3 of Figure 4 illustrating the construction of the switch comprising one of the elements of the invention;

Figure 4 is a vertical sectional view as taken along the plane of line 4—4 in Figure 3; and, Figure 5 is a sectional detail view illustrating a modified form of the invention employing a mercury switch.

Figure 1:
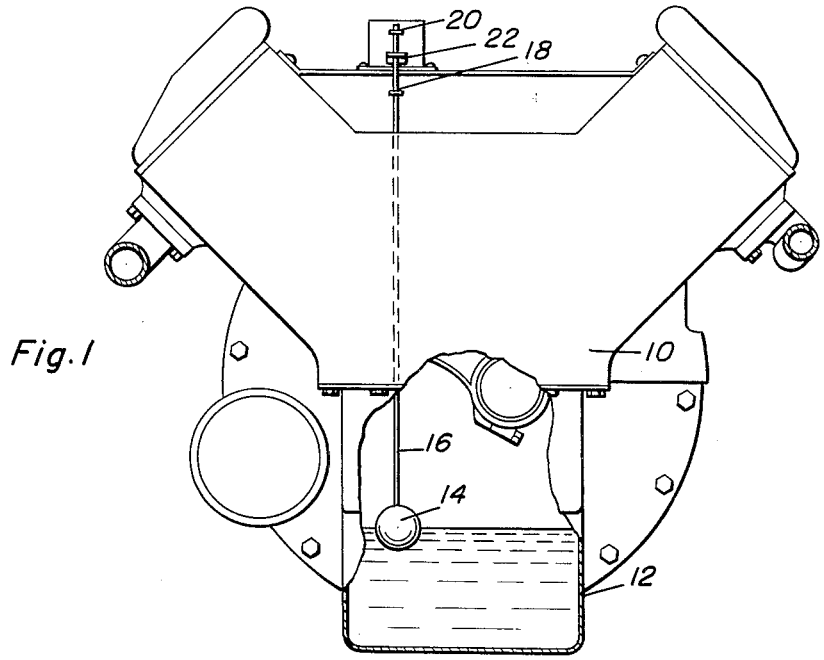
Figure 1 is a front end view of an internal combustion engine with parts thereof being broken away to show the oil level indicator comprising the present invention in detail.

With continuing reference to the accompanying drawings wherein like reference numerals designate similar parts throughout the various views, reference numeral 10 generally designates an internal combustion engine as is commonly used in passenger cars, trucks, and other motor vehicles. An oil container or crank case 12 is provided for retention of the lubrication oils for lubricating the bearings, pistons, cylinder walls, valves, and other moving parts of the motor 10. In order to maintain the lubricating oils at a proper degree of consistency and free from adulteration and at the proper temperature, it is necessary that a minimum quantity of oil be maintained within the crank case. The device comprising the present invention is especially adapted to provide a signal to an operator of a vehicle before the danger point is reached in order that he may readily refill the crank case to improve the lubrication of the motor 10.

Figure 2:
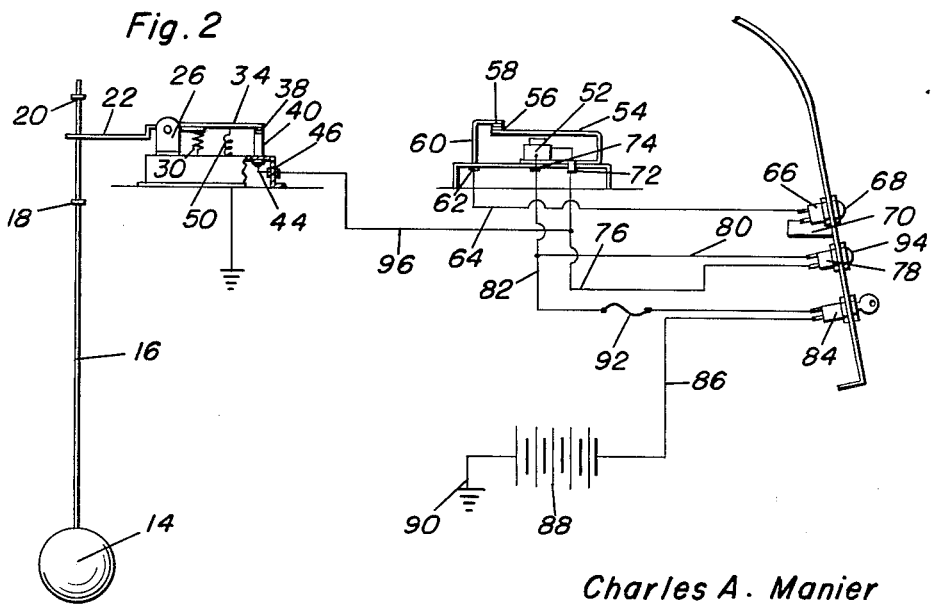
Figure 2 is a circuit diagram of the electrical circuits used in this invention.

This invention in the embodiment thereof as shown in Figures 1–4 includes the concept of the provision of a float 14 to which is attached a float rod 16. The float rod 16 extends vertically upwardly and has attached thereto stop elements 18 and 20 for limiting the relative movement of the float 14, and an insulated actuating lever 22. The actuating lever 22 is provided with an aperture 24 therethrough within which the rod 16 is slidably inserted. The insulated actuating lever 22 is of a horizontally elongated substantially S-shape and is pivoted adjacent the end thereof remote from the rod 16 to a bracket 26. The bracket 26 is mounted on a plate 28 and a coil spring 30 continuously biases the end 32 adjacent the bracket 26 and the plate 28. It is to be noted that the plate 28 is grounded.

Carried by the actuating lever 22 is a first contact member 34 in the form of an extension of the actuating lever 22 terminating in a contact tip 36 which is adapted to engage the contact 38 mounted on the end of an insulated support 40. A conductor 42 extends through the insulated support 40 and is connected to the plate 38 and is connected by means of a suitable conductor 44 to a terminal 46 mounted on the switch casing 48. The contact member 34 is ground to the plate 28 by means of a suitable conductor 50.

A relay is provided consisting of a solenoid 52 adapted to actuate a spring-like contact member 54 of electrically conductive material which has a contact plate 56 mounted on one end thereof. The contact plate 56 is adapted to engage a contact plate 58 mounted on another contact member of electrically conductive material as indicated at 60. The contact member 60 is connected through terminal 62 to a conductor 64 connected to one terminal of a lamp socket 66 in which a red colored electric lamp 68 is installed. The other terminal of the socket is connected by conductor 70 to ground. The core of the solenoid 52 is connected in parallel with the conductive contact member 54 through terminals 72 and 74. A conductor 76 connects one terminal of a lamp socket 78 to the terminal 72. Another conductor 80 connects the other terminal of the lamp socket 78 to a conductor 82 interconnecting the terminal 74 with one terminal of a key actuated ignition switch 84. The other terminal of the key actuated ignition switch 84 is connected through conductor 86 through a battery 88 which is grounded as at 90. A fuse 92 is provided within conductor 82. The lamp socket 78 is adapted to receive a green colored lamp 94. Thus by using the key actuated ignition switch 84, when the key is turned to the oil check position the ignition circuit will be broken thus actuating the oil level indicator and providing a check on the oil with the motor not running.

In operation, when the float 14 in the crank case 12 drops due to a low oil level, the float rod 16 will drop through the aperture 24 in the lever 22 until the stop member 20 forces the lever arm 22 to pivot about the bracket 26 thus breaking the contact between contact tips 36 and 38. This completes an operative electrical circuit from the battery through the conductor 86 and conductor 82 through the contact member 54 and the contact member 60 and through the lamp 68 and conductor 70 to the ground. When oil is poured into the crank case 12, the float 14 will rise thus permitting the switch to close providing an electrical circuit from the battery 88 through the conductor 86 and the conductor 82 through the electromagnet 52 and thence through a conductor 96 interconnecting the terminal 46 with the terminal 72 thence through the contact plates 38 and 36 and through the conductor 50 to ground. This will permit the green lamp 94 to be activated due to its parallel connection therewith.

In the embodiment of the invention as is shown in

Figure 5, a float 100 is mounted on a rod 102 which has a mercury switch 104 in an oil resistant case. Insulated wires 106 and 108 lead from the mercury switch 104 to suitable terminals as is indicated at 110 mounted on a plate 112. The conductor 108, from the mercury switch 104, grounds to the crank case 12 through the plate 112. The terminal 110 is interconnected by a suitable conductor to the terminal 72 of a relay which permits operation in exactly the same manner as the construction shown through 4.

Since from the foregoing, the construction and advantages of this oil level indicator are readily apparent, further description is believed to be unnecessary. However, since numerous modifications will readily occur to those skilled in the art, after a consideration of the foregoing specification and accompanying drawings, it is not intended to limit the invention to the precise embodiment shown and described, but all suitable modifications and equivalents may be readily resorted to as desired.

What is claimed as new is as follows:

An oil level indicator system for providing a signal indicating when the lubricating oil in the crank case of an internal combustion engine is at a safe level and for providing a differing signal when the level of lubricating oil is at a low level comprising a float, a switch actuated by said float, a pair of signal lamps, and a relay actuated by the position of said switch selectively connecting one of said signal lamps to a source of electrical power, one of said signal lamps being operatively electrically connected in parallel connection with said relay through said switch to said source of electrical power when said switch is in a circuit closed position, the other of said signal lamps being directly connected in series connection through said relay to said source of electrical power when said switch is in a circuit open position, said float having a float rod attached thereto, an electrically insulative switch actuating lever, an aperture in said lever, said rod slidably extending through said aperture, stop means on said rod for engaging and actuating said lever upon extended movement of said rod, a first contact of said switch carried by said lever adapted to engage second contact of said switch to actuate said relay when said float is in a raised position, said relay being deactivated by said stop means engaging said lever to separate said first and second contacts breaking the electrical circuit to said relay when said float is in a lowered position due to a low oil level.

References Cited in the file of this patent

UNITED STATES PATENTS

| | | |
|---|---|---|
| 1,604,492 | Smith | Oct. 26, 1926 |
| 2,120,825 | Wolfert | June 14, 1938 |
| 2,184,755 | Pratt | Dec. 26, 1939 |
| 2,329,502 | Withrow | Sept. 14, 1943 |
| 2,611,048 | Reading | Sept. 16, 1952 |